US008213029B2

(12) United States Patent
Tsue et al.

(10) Patent No.: US 8,213,029 B2
(45) Date of Patent: Jul. 3, 2012

(54) APPARATUS, METHOD, AND PROGRAM FOR EDITING IMAGES FOR A PHOTO ALBUM

(75) Inventors: Takashi Tsue, Kanagawa-ken (JP); Koichi Yamada, Kanagawa-ken (JP); Kazuhiro Mino, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/111,994

(22) Filed: May 20, 2011

(65) Prior Publication Data

US 2011/0216368 A1    Sep. 8, 2011

Related U.S. Application Data

(62) Division of application No. 12/688,320, filed on Jan. 15, 2010, now Pat. No. 7,969,591, which is a division of application No. 10/998,158, filed on Nov. 29, 2004, now Pat. No. 7,675,635.

(30) Foreign Application Priority Data

Nov. 27, 2003   (JP) ................................. 2003-396850
Nov. 24, 2004   (JP) ................................. 2004-338284

(51) Int. Cl.
  *G06F 15/00*   (2006.01)
  *G06F 3/12*    (2006.01)
  *G06K 1/00*    (2006.01)
(52) U.S. Cl. ..................................... 358/1.13; 358/1.14
(58) Field of Classification Search ........................ None
See application file for complete search history.

(56) References Cited

U.S. PATENT DOCUMENTS

| 5,956,737 | A | 9/1999 | King et al. |
| 6,977,665 | B2 | 12/2005 | Yokouchi |
| 7,148,990 | B2 | 12/2006 | Atkins et al. |
| 2001/0028394 | A1 | 10/2001 | Matsumoto et al. |
| 2002/0019833 | A1* | 2/2002 | Hanamoto ................... 707/500 |
| 2002/0040375 | A1 | 4/2002 | Simon et al. |
| 2002/0087352 | A1* | 7/2002 | Armstrong et al. ............... 705/1 |
| 2002/0099565 | A1 | 7/2002 | Kito |
| 2002/0107737 | A1 | 8/2002 | Kaneko et al. |
| 2005/0007468 | A1 | 1/2005 | Stavely et al. |
| 2005/0219665 | A1 | 10/2005 | Mino |

FOREIGN PATENT DOCUMENTS

| JP | 9-054837 A | 2/1997 |
| JP | 9-214868 A | 8/1997 |
| JP | 2001-155175 A | 6/2001 |
| JP | 2002-111995 A | 4/2002 |
| JP | 2003-182260 A | 7/2003 |
| JP | 2003-187257 A | 7/2003 |

* cited by examiner

OTHER PUBLICATIONS

Entry for Header (Information Technology, Wikipedia.com, Jul. 7, 2009).

*Primary Examiner* — Douglas Tran
(74) *Attorney, Agent, or Firm* — Sughrue Mion, PLLC

(57) ABSTRACT

For generating photo albums on events such as weddings, the photo albums can always be generated in the same quality. A professional photographer photographs the bride and groom on a wedding. Images are read from a developed film and stored in a file server. A template used for generating a photo album is added with composition information representing composition of images to be inserted in image insertion areas therein. When an operator selects one of the images to be inserted in any one of the image insertion areas with reference to an editing screen having a catalog display field and a template display field, processing information representing a magnification ratio and/or a trimming position is generated based on the composition information so that the selected image has the composition appropriate for the image insertion area. The selected image is processed according to the processing information.

3 Claims, 8 Drawing Sheets

TEMPLATE T1
 1-a:COMPOSITION INFORMATION 1
 1-b:COMPOSITION INFORMATION 2
 1-c:COMPOSITION INFORMATION 3
 2-a:COMPOSITION INFORMATION 4

FIG.5

COMPOSITION INFORMATION 1
1. SIZE x=960, y=640
2. TWO PEOPLE ARE CONTAINED
3. TWO FACES ARE SIDE-BY-SIDE
4. THE AREA AROUND THE RIGHT SIDE PERSON IS WHITE
5. THE LINE BETWEEN TWO PEOPLE FITS IN THE CENTER LINE OF THE IMAGE
6. THE FACE OF THE LEFT SIDER PERSON IS FIT IN THE AREA A1 AND THE FACE OF THE RIGHT SIDER PERSON IS FIT IN THE AREA A2

TEMPLATE T1
1-a :DSCF0012.jpg
1-b :DSCF0020.jpg
1-c :DSCF0023.jpg
2-a :DSCF0030.jpg

FIG.8

FIG.9
```
TEMPLATE T2
  1-a : COMPOSITION INFORMATION 1-1, 1-2, 1-3
  1-b : COMPOSITION INFORMATION 2-1, 2-2
  1-c : COMPOSITION INFORMATION 3-1, 3-2, 3-3
  2-a : COMPOSITION INFORMATION 4-1, 4-2, 4-3
```

| TEMPLATE T3 | | | | |
|---|---|---|---|---|
| 1-a | COMPOSITION INFORMATION | 1-1 | 1-2 | 1-3 |
| 1-b | COMPOSITION INFORMATION | 2-1 | 2-2 | 2-3 |

| TEMPLATE T5 | | | | |
|---|---|---|---|---|
| 1-a | COMPOSITION INFORMATION | 1-1 | 1-2 | 1-3 |
| 1-b | COMPOSITION INFORMATION | 2-1 | 2-2 | 2-3 |

APPARATUS, METHOD, AND PROGRAM FOR EDITING IMAGES FOR A PHOTO ALBUM

CROSS REFERENCE TO RELATED APPLICATIONS

This is a divisional application of application Ser. No. 12/688,320, filed Jan. 15, 2010, which is a divisional of application Ser. No. 10/998,158, filed Nov. 29, 2004, now U.S. Pat. No. 7,675,635, which claims priority from JP Patent Application No. 396850/2003 filed Nov. 27, 2003 and JP Patent Application No. 338284/2004 filed Nov. 24, 2004. Each of the above-noted applications is incorporated herein by reference in its entirety.

BACKGROUND OF THE INVENTION

1. Field of the Invention

The present invention relates to an image editing apparatus and an image editing method for selecting an image to be inserted in an image insertion area in a template. The present invention also relates to a program for causing a computer to execute the image editing method.

2. Description of the Related Art

As has been described in Japanese Unexamined Patent Publication No. 9(1997)-214868, a method has been proposed for generating a photo album by reading images from a film with a film scanner and by printing an image including a selected part of the images arranged in desired layout.

In addition, another method has also been proposed in Japanese Unexamined Patent Publication No. 2003-182260 for generating a photo album by printing desired images as photographs and by inserting the photographs in photo mounting corners formed on photo album paper according to a size of the photographs and layout of the photo album.

Meanwhile, in order to generate a photo album on a wedding, a professional photographer sometimes photographs the bride and groom as well as attendants in front of a church as a venue for the wedding or in front of a monument during the wedding. Images obtained in this manner are used for generating a photo album, and the photo album tells a story that can be enjoyed later, since the album traces the behavior of the bride and groom on the day.

In order to generate a photo album, a professional photographer or an operator at a DPE store that provides a photo album generation service (hereinafter collectively referred to as an operator) stores images obtained by photography in an image server, and displays on display means such as a monitor of a workstation a catalog of the images stored in the image server and a template having an image insertion area used for photo album generation. The operator then selects one of the images to be inserted in the image insertion area from the catalog. At this time, the operator carries out image editing processing such as processing for changing image quality (blurring or sharpness enhancement, for example), processing for image reshaping (such as rotation, resizing, and trimming), and processing for image restoration (such as red-eye correction and scar removal) on the selected image so that the image inserted in the image insertion area can look attractive.

A photo album is generated by printing images edited in the above manner and pasting the images on photo album paper. A photo album can also be generated by printing composite images having a layout of the photo album generated from edited images inserted in image insertion areas of a template, as has been described in Japanese Unexamined Patent Publication No. 9 (1997)-214868.

However, an image editing operation largely depends on skills of an operator. In the case of image processing especially, a size of an image after the processing and a trimming range changes from operator to operator. For this reason, a photo album generated by a skilled operator looks substantially attractive while a photo album generated by a poorly skilled operator does not look attractive although a charge for photo album generation may be the same for both cases. Furthermore, how well photo albums are generated may be different from day to day even if the same operator generates the photo albums.

SUMMARY OF THE INVENTION

The present invention has been conceived based on consideration of the above circumstances. An object of the present invention is therefore to enable generation of photo albums on events such as weddings in a constant quality.

An image editing apparatus according to the first aspect of the present invention, comprises:

a display unit which displays various kinds of information thereon;

an image display control unit which displays a catalog of plural images on the display unit;

a template display control unit which displays on the display unit the catalog of plural images and a template being used as a photo album paper, said template having at least one image insertion area, each area attached with composition information representing composition of an image or images to be inserted in the area;

a designation reception unit which receives designation of image insertion area in the template displayed on the display unit;

an image selection unit which receives selection of image to be inserted in the designated image insertion area from the catalog of plural images; and a processing information generation unit which generates processing information including information on a magnification ratio and/or a trimming position regarding the selected image to be inserted in the designated image insertion area in order to process the selected image to have the composition represented by the composition information, with reference to the composition information of the designated image insertion area. The template is used as a photo album paper.

Various kinds of information for determining the composition of the image to be inserted in the image insertion area can be used as the composition information. More specifically, at least one of: the type of subject included in the image, a position thereof in the image, a color thereof, the number of subjects of the same type, arrangement of the subjects if the number is larger than 1, a size of the corresponding image insertion area, and a size of plain background to a size of the subject can be used.

The magnification ratio includes a value smaller than 1, that is, a value for reducing the image.

An image editing apparatus according to the second aspect of the present invention, comprising:

a display unit which displays various kinds of information thereon;

an image display control unit which displays a catalog of plural images on the display unit;

a template display control unit which displays on the display unit the catalog of plural images and a template being used as a photo album paper, said template having at least one image insertion area, each area attached with multiple pieces of composition information representing composition of an image or images to be inserted in the area;

a designation reception unit which receives designation of image insertion area in the template displayed on the display unit;

an image selection unit which receives selection of image to be inserted in the designated image insertion area from the catalog of plural images; and a processing information generation unit which selects a piece of composition information suitable for the selected image from the multiple pieces of compensation information attached to the designated image insertion area, and generates processing information including information on a magnification ratio and/or a trimming position regarding the selected image in order to process the selected image to have the composition represented by the selected composition information, with reference to the selected composition information of the designated image insertion area.

An image editing apparatus according to the third aspect of the present invention, comprising:

a display unit which displays various kinds of information thereon;

an image display control unit which displays a catalog of plural images on the display unit;

a template display control unit which displays on the display units the catalog of plural images and a template being used as photo album paper, said template having plural image insertion areas, each area attached with at least a piece of composition information representing composition of an image to be inserted in the area, and correspondence information representing a correspondence between composition information attached to a predetermined image insertion area and composition information attached to a correspondence image insertion area corresponding to said predetermined image insertion area, in order to process an image to be inserted in the predetermined composition area and an image to be inserted in the correspondence image insertion area to have a composition in relation with each other;

a designation reception unit which receives designation of image insertion area in the template displayed on the display means;

an image selection unit which receives selection of two images, the one is inserted in the predetermined image insertion area and the other is inserted in the correspondence image insertion area, from the catalog of plural images; and a processing information generation unit which selects a piece of composition information suitable for the selected image to be inserted in the predetermined image insertion area from the composition information of the predetermined image insertion area in accordance with a scene property of the selected image, selects a piece of composition information suitable for the correspondence image insertion area from the composition information of the correspondence image insertion area with reference to the correspondence information, and generates processing information including information on a magnification ratio and/or a trimming position regarding each image to be inserted in each area in order to process each image to have the composition represented by each selected composition information, with reference to the selected composition information of the predetermined image insertion area and the selected composition information of the correspondence image insertion area.

An image editing apparatus according to the fourth aspect of the present invention, comprising:

a display unit which displays plural kinds of information thereon;

an image display control unit which displays a catalog of plural images on the display unit;

a template image display control unit which displays on the display unit the catalog and a template being used as a photo album paper, said template having plural image insertion areas, each area attached with at least a piece of composition information representing composition of an image to be inserted in the area, and correspondence information representing correspondence between composition information attached to a predetermined image insertion area and composition information attached to a correspondence image insertion area in order to process an image to be inserted in the predetermined image insertion area to have a composition suitable for the correspondence image insertion area;

a designation reception unit which receives designation of image insertion area in the template displayed on the display unit;

an image selection unit which receives selection of image to be inserted in the predetermined image insertion area from the catalog of plural images; and a processing information generation unit which selects a piece of composition information suitable for the selected image to be inserted in the predetermined image insertion area from the composition information attached to the predetermined image insertion area in accordance with a scene property of the selected image, selects a piece of composition information suitable for the correspondence image insertion area from the composition information attached to the correspondence image insertion area with reference to the correspondence information, and generates processing information including information on a magnification ratio and/or a trimming position regarding the selected image to be inserted in the predetermined area in order to process the selected image to have a composition represented by the selected composition information of the predetermined image insertion area and the selected composition information of the correspondence image insertion area. In addition, the image editing apparatus of the present invention may also comprise editing means for editing the image or images inserted in the image insertion area or areas.

An image editing method according to the first aspect of the present invention, comprising the steps of:

displaying a catalog of plural images on a display unit;

displaying on the display unit the catalog of plural images and a template being used as photo album paper, said template having at least one image insertion area, each area attached with composition information representing composition of an image to be inserted in the area;

receiving designation image insertion area in the template displayed on the display unit;

receiving selection of image to be inserted in the designated image insertion area from the catalog of plural images; and generating processing information including information on a magnification ratio and/or a trimming position regarding the selected image to be inserted in the designated image insertion area in order to process the selected image to have the composition represented by the composition information, with reference to the composition information of the designated image insertion area.

An image editing method according to the second aspect of the present invention, comprising the steps of:

displaying a catalog of plural images on a display unit:

displaying the catalog of plural images and a template being used as a photo album paper, said template having at least one image insertion area, each area attached with multi pieces of composition information representing compositions of image to be inserted in the area;

receiving designation of image insertion area in the template displayed on the display unit;

receiving selection of image to be inserted in the designated image insertion area from the catalog of plural images;

selecting a piece of composition information suitable for the selected image to be inserted in the designated image insertion area from the multi pieces of composition information attached to the designated image insertion area, in accordance with a scene property of the selected image; and generating processing information including information on a magnification ratio and/or a trimming position regarding the selected image to be inserted in the designated image insertion area in order to process the selected image to have the composition represented by the selected composition information, with reference to the selected composition information.

An image editing method according to the third aspect of the present invention, comprising the steps of:

displaying a catalog of plural images on a display unit;

displaying on the display unit the catalog of plural images and a template being used as a photo album paper, said template having plural image insertion areas, each area attached with at least a piece of composition information representing composition of image to be inserted in the area, and correspondence information representing correspondence between composition information attached to a predetermined image insertion area and composition information attached to a correspondence image insertion area corresponding to the predetermined image insertion area in order to process an image to be inserted in the predetermined area and an image to be inserted in the correspondence image insertion area to have a composition in related with each other;

receiving designation of image insertion area in the template displayed on the display unit;

receiving selection of two images from the catalog of plural images, the one is to be inserted in the predetermined image insertion area and the other is to be inserted in the correspondence image insertion area;

selecting a piece of composition information suitable for the selected image to be inserted in the predetermined image insertion area from the composition information attached to the predetermined image insertion area in accordance with a scene property of the selected image;

selecting a piece of composition information suitable for the correspondence image insertion area from the composition information attached to the correspondence image insertion area, with reference to the correspondence information;

generating processing information including information on a magnification ratio and/or a trimming position regarding each selected image in order to process each selected image to have a composition represented by each selected composition information, with reference to the selected composition information of the predetermined image insertion area and the selected composition information of the correspondence image insertion area.

An image editing method according to the fourth aspect of the present invention, comprising the steps of:

displaying a catalog of plural images on a display unit;

displaying on the display unit the catalog of plural images and a template being used as a photo album paper, said template having plural image insertion areas, each area attached with at least a piece of composition information representing composition of image to be inserted in the area, and correspondence information representing correspondence between composition information attached to a predetermined image insertion area and composition information attached to a correspondence image insertion area corresponding to the predetermined image insertion area in order to process an image to be inserted in the predetermined image insertion area to have a composition suitable for the correspondence image insertion area;

receiving designation of image insertion area in the template displayed on the display unit;

receiving selection of image to be inserted in the predetermined image insertion area from the catalog of plural images;

selecting a piece of composition information suitable for the selected image to be inserted in the predetermined image insertion area from the composition information attached to the predetermined image insertion area, in accordance with a scene property of the selected image;

selecting a piece of composition information suitable for the correspondence image insertion area from the composition information attached to the correspondence image insertion area, with reference to the correspondence information; and generating processing information including information on a magnification ratio and/or a trimming position regarding the selected image to be inserted in the predetermined image insertion area in order to process the selected image to have the composition represented by each selected composition information, with reference to the selected composition information of the predetermined image insertion area and the selected composition information of the correspondence image insertion area.

Additionally, it may be possible to provide the above image editing methods according to any one of the first to fourth aspect of the present invention, as a program for causing a computer to execute the method.

According to the first aspect of the present invention, the catalog of the images and the template are displayed on the display means, and designation and selection input by an operator is received regarding the image insertion area and the image to be inserted therein. The processing information including the information on the magnification ratio and/or the trimming position regarding the image to be inserted in the insertion area is then generated so that the image can have the composition represented by the composition information, with reference to the composition information of the specified image insertion area. Therefore, upon generation of a photo album, the image to be inserted in the image insertion area is processed with reference to the processing information. Therefore, if the same template is used, composition of the image or images to be included in the photo album can be the same as the composition represented by the composition information added to the template. Consequently, the composition of the image or images cannot be different depending on operators or depending on days, which realizes generation of photo albums having a constant quality. Furthermore, since an editing operation for determining the magnification ratio and/or the trimming position for the image or images to be inserted becomes unnecessary, a burden on the operator can be reduced.

Further, there is a problem unable to deal flexibly with various kinds of images in a case that each image insertion area in one template has only one piece of composition information. Therefore, in the image editing apparatus/method according to the second aspect of the present invention, each image insertion area has multi pieces of composition information and the suitable composition information for the image to be inserted is selected from the multi pieces of composition information in accordance with the scene property of the image. By this feature, it is possible to deal flexibly with various kinds of images.

Moreover, if the template has plural image insertion areas, correspondence information among the image insertion areas is necessary. For example, regarding a template which is used for a book, album, or the like, bound with a double spread type, there are some cases that the compositions of a right page and a left page are different from each other. In particular, if the images of faces of a bride and a groom are inserted in the double spread pages, it is preferred that the face image to be inserted in a right page is left-pointing and the face image to be inserted in a left page is right pointing. Additionally, if an image of a bride with a white dress is inserted in an image insertion are of a page, it is a common practice not to include images of bride with a colored dress or a kimono in other image insertion areas of the page.

Therefore, in the image editing apparatus/method according to the third aspect of the present invention, the template has plural image insertion areas and at least a piece of composition information is attached to each area. If correspondence information, which represents correspondence between composition information of a predetermined image insertion area and composition information of a correspondence image insertion area corresponding to the predetermined image insertion area, is attached to the template, each of images inserted in the predetermined image insertion area and the correspondence image insertion area is selected, a piece of composition information of the predetermined image insertion area is selected in accordance with the scene property of the selected image, a piece of composition information of the corresponding image insertion area is selected with reference to the correspondence information, and processing information is generated with reference to the selected composition information of the both areas. Accordingly, it is possible to process each selected image to have a composition suitable for the predetermined image insertion area and the correspondence image insertion area.

Additionally, in a case that apart of an image to be inserted in a main image insertion area is magnified and inserted in other image insertion area, the part to be magnified depends on details of the main image to be inserted in the main image insertion area. For example, if the main image is a scene of exchanging rings at wedding ceremony, a part in the region of hands of the bride and groom is magnified. If the main image is a scene of signing a wedding pledge card, a part in the region of the pledge card is magnified.

Therefore, in the image editing apparatus/method according to the fourth aspect of the present invention, the template has plural image insertion areas and each area is attached with at least one piece of composition information. In order to process the image to be inserted in the predetermined image insertion area to have a composition suitable for the correspondence image insertion area corresponding to the predetermined area, the template further has correspondence information representing the correspondence between composition information attached to the predetermined image insertion area and composition information attached to the correspondence image insertion area. If the template has the correspondence information, an image to be inserted in the predetermined image insertion area is selected, a piece of composition information of the predetermined image insertion area is selected in accordance with the scene property of the selected image, apiece of composition information of the correspondence image insertion area is selected with reference to the correspondence information, and then the processing information is generated with reference to each selected composition information. Thereby, the image is processed to have a composition suitable for the predetermined image insertion area and the correspondence image insertion area.

DESCRIPTION OF THE PREFERRED EMBODIMENT

Figure 1:
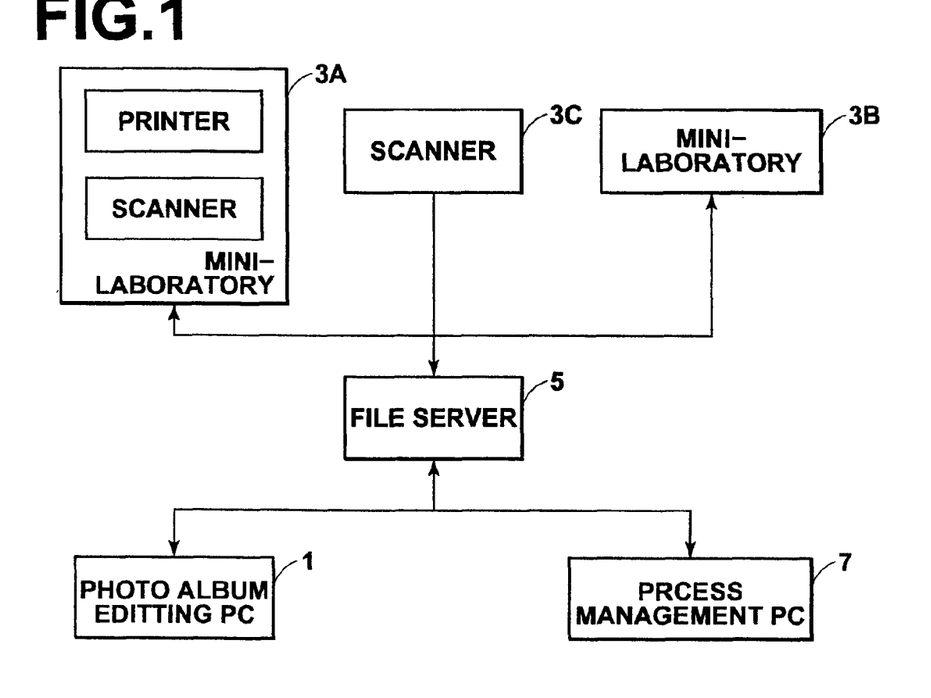
FIG. 1 a block diagram showing a configuration of an image editing system comprising an image editing apparatus of an embodiment of the present invention.

Hereinafter, a first embodiment of the present invention will be explained with reference to the accompanying drawings. FIG. 1 is a block diagram showing a configuration of an image editing system having an image editing apparatus of the first embodiment of the present invention. As shown in FIG. 1, the image editing system in this embodiment comprises a photo album editing personal computer (hereinafter referred to as the photo album editing PC) 1, a plurality (2, in this case) of mini-laboratories 3A and 3B, a film scanner (hereinafter referred to as a scanner) 3C, a file server 5, and a process management PC 7 connected to each other via a network. The photo album editing PC 1 has functions of the image editing apparatus as the embodiment of the present invention. Each of the mini-laboratories 3A and 3B has a scanner for obtaining image data sets representing images recorded on a developed negative or positive film or prints by reading the images from the film or prints, and a printer for printing the image data sets. The file server 5 has a large-capacity hard disc for storing the image data sets. The process management PC 7 manages processes of photo album generation.

In this embodiment, the case of a wedding as an event will be explained. In the wedding, a professional photographer photographs the bride and groom who requested photo album generation (hereinafter referred to as a user) on the day of wedding, and the photographer generates a photo album telling a story of the event by using the photographs. However, the event is not necessarily limited to a wedding.

Figure 2:
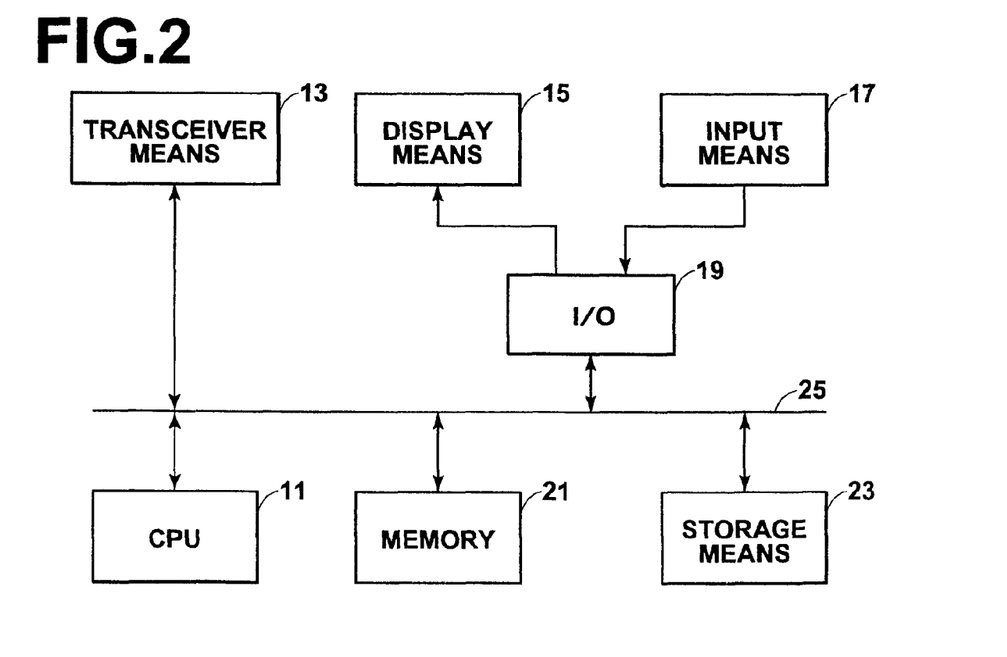
FIG. 2 is a block diagram showing a configuration of a photo album editing PC.

FIG. 2 is a block diagram showing a configuration of the photo album editing PC 1. As shown in FIG. 2, the photo album editing PC 1 comprises a CPU 11 (acting as the image display control means, the template display control means, and the processing information generation means), transceiver means 13 for networking, display means 15, an I/O 19, memories 21, and storage means 23. The CPU 11 controls the photo album editing PC 1. The transceiver means 13 sends and receives the image data sets and various kinds of information to and from the file server 5. The display means 15 displays various kinds of information such as the images and a template. The I/O 19 reads various kinds of information input by an operator via input means 17 (acting as the specification reception means and the image selection means) for delivering the information to the CPU 11. The I/O 19 also outputs a display instruction to the display means 15 according to an instruction from the CPU 11. The memories 21 comprise a ROM storing a program for operating the CPU 11 and various constants, and a RAM used by the CPU 11 as a workspace. The storage means 23 comprises a hard disc or the like for storing various kinds of information such as the image data sets.

A bus 25 connects the CPU 11 in the photo album editing PC 1 to peripheral circuits including the transceiver means 13, the I/O 19, the memories 21, and the storage means 23. In this manner, the CPU 11 can control the peripheral circuits. More specifically, the CPU 11 controls the transceiver means 13, the display means 15, the memories 21, and the storage means 23 for reception of information such as the image data sets and a template data set that will be explained later from the file server 5, for storing the image data sets in the storage means 23, and for displaying a catalog and the template on the display means 15 in order to select the image or images to be inserted in an image insertion area or image insertion areas (hereinafter referred to as the image insertion areas) of the template, to generate image editing information, and to transmit the image editing information to the file server 5 in response to an instruction input from the input means 17 by the operator.

The photo album editing PC 1 receives photo album editing information comprising information on the template specified by the user who requested photo album generation and a user ID when the operator carries out a photo album editing operation. The photo album editing PC 1 sends the photo album editing information to the file server 5, and receives the template data set, the image data sets, and guide image data sets to be inserted in the image insertion areas in the template from the file server 5. The photo album editing PC 1 then reduces the image data sets for generating the catalog of the images represented by the image data sets, and inserts guide images represented by the guide image data sets in the image insertion areas of the template represented by the template data set. In this manner, the photo album editing PC 1 displays an editing screen including the catalog and the template having the guide images inserted therein on the display means 15.

Figure 3:
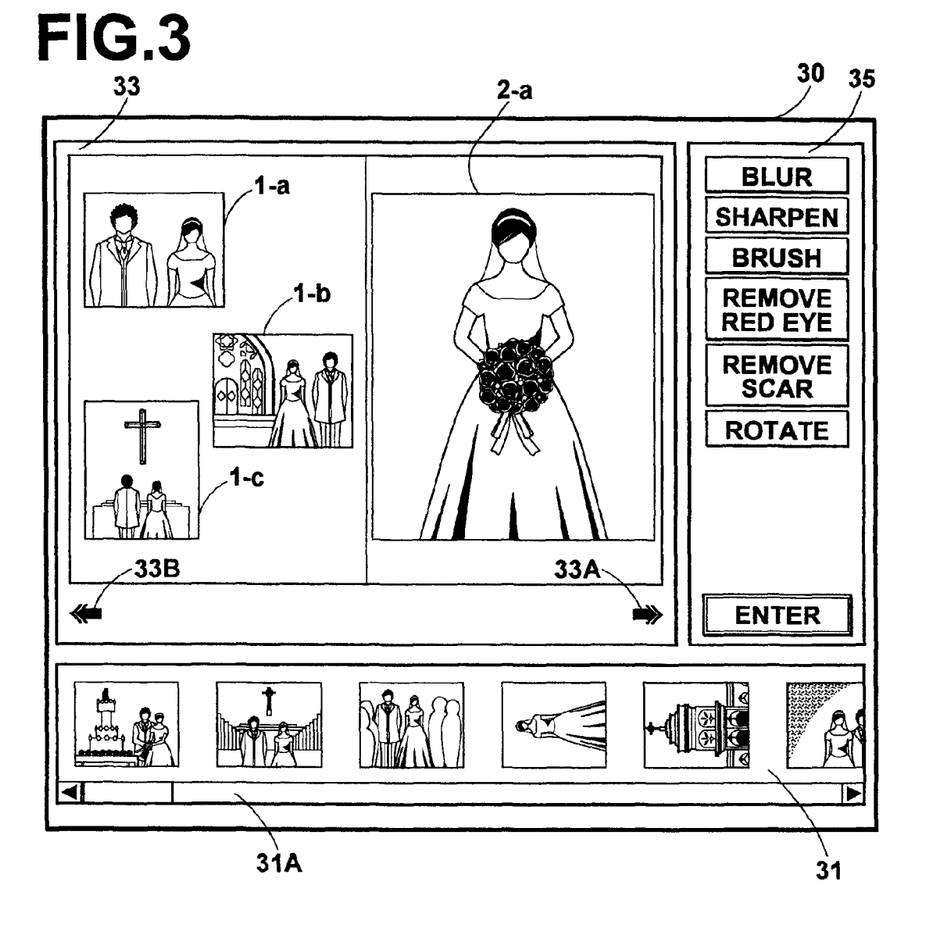
FIG. 3 shows an example of an editing screen.

FIG. 3 shows an example of the editing screen. As shown in FIG. 3, an editing screen 30 includes a catalog display field 31 in which the catalog is displayed, a template display field 33 in which the template having the guide images inserted therein is displayed, and a tool box 35.

A scroll bar 31A is displayed in the catalog display field 31. By moving the scroll bar 31A to the right or left, a part of the images that cannot be displayed in one screen can be displayed.

In the example shown in FIG. 3, a template T1 displayed in the template display field 33 includes 4 image insertion areas named 1-*a*, 1-*b*, 1-*c*, and 2-*a*, all of which respectively have the guide images inserted therein.

The guide images notify the operator who carries out the photo album editing operation of what composition the respective images should have in the corresponding image insertion areas in the template. In the case of photography for generating photo albums on events, the photography is carried out at the same place and in the same situation regardless of who a user as a requester is. For example, in the case of photography of brides and grooms in weddings, photography is carried out at a predetermined place in a hotel and in a predetermined situation such as exchange of marriage rings and cutting a wedding cake.

Therefore, by using the same composition for the images to be inserted in the image insertion areas in the template for all users that selected the same template, a quality of photo albums generated in the above manner can be constant. Consequently, the guide images can be illustrations representing the composition to be inserted in the image insertion areas, drawings, or sample images obtained by photography of a model in an actual place or in an actual situation, for example. In this embodiment, sample images generated by photographing a model are inserted in the image insertion areas 1-*a*, 1-*b*, 1-*c*, and 2-*a*.

In the template display field 33 are displayed arrow buttons 33A and 33B for changing a page of the template being displayed in the template display field 33 in the case where the template has a plurality of pages. The operator can change the page of the template to be displayed in the editing screen 30 by clicking the arrow button 33A or 33B.

In the tool box 35 are displayed buttons for carrying out image quality changing processing such as blurring, sharpening, and brushing, buttons for carrying out image restoration processing such as red-eye correction and scar removal, a button for image rotation, and an OK button for ending the processing.

The operator carries out the photo album editing operation by inputting photo album editing instructions while using the editing screen 30. More specifically, the operator selects a corresponding one of the images having the same composition as the guide image inserted in one of the image insertion areas from the catalog, and drags and drops the selected image by using the input means 17. In this manner, the operator inserts the selected image in the corresponding image insertion area. After the insertion, the operator selects the image insertion area, and edits the selected image inserted therein by clicking any one of the buttons in the tool box 35. For example, by clicking the button for rotation, the operator can rotate the image by 90 degrees in the clockwise direction. By clicking the button for resizing, the operator can change a size of the image. Furthermore, by clicking the button for blurring or sharpening or brushing, a quality of the image can be changed. By clicking the button for red-eye correction or scar removal, the image can be restored.

Figure 4:
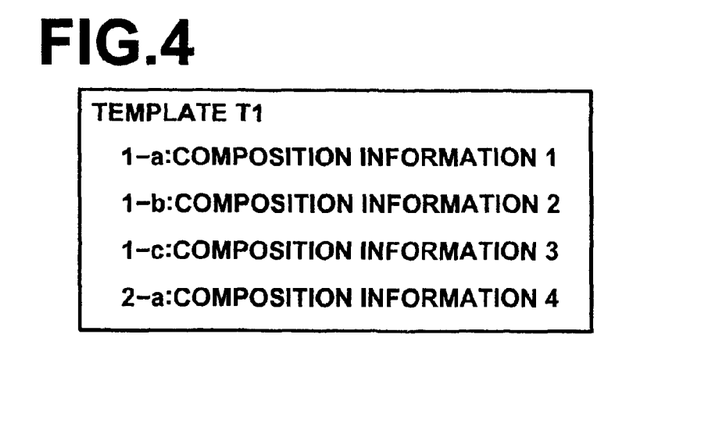
FIG. 4 shows an example indicating that composition information is related to an image insertion area in the first embodiment.

According to the first embodiment, the template data set is recorded with composition information representing the composition of the images to be inserted in the image insertion areas therein. For example, as shown in FIG. 4, composition information 1 to 4 representing the composition of the images to be inserted in image insertion areas 1-*a*, 1-*b*, 1-*c*, and 2-*a* is recorded in a header of the template T1 represented by the template data set.

Various kinds of information enabling determination of the composition of each of the images to be inserted in the corresponding image insertion area can be used as the composition information. More specifically, at least one of: the type of subject included in the image, a position thereof, a color thereof, the number of subjects of the same type, arrangement of the subjects if the number is larger than 1, a size of the image insertion area, and a size of plain background of the subject can be used.

Figure 5:
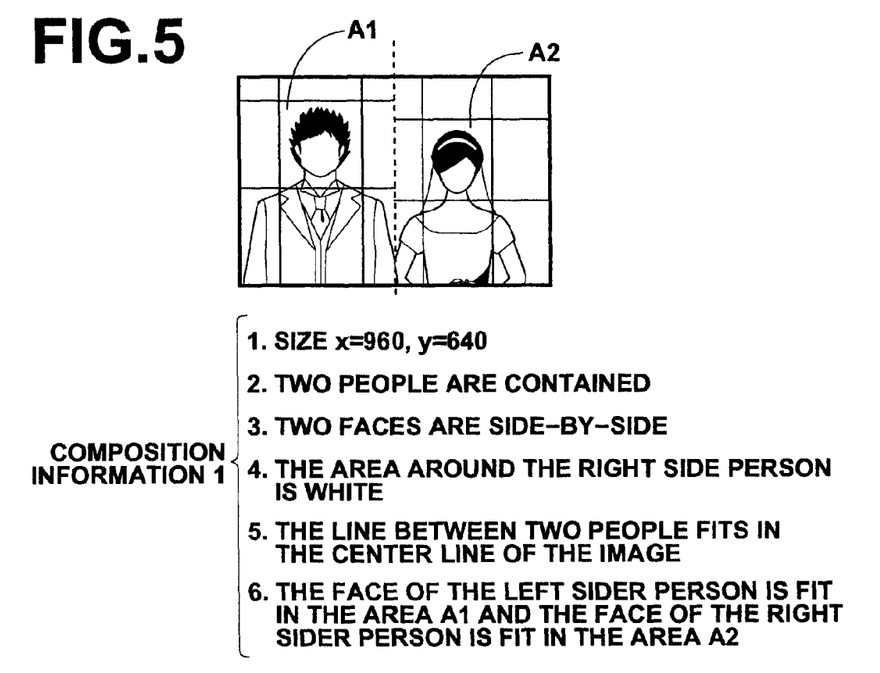
FIG. 5 shows an example of the composition information.

For example, in the case where the image insertion area 1-*a* needs to be filled with an image whose composition is close-up of the faces of the bride and groom, the composition information 1 on the image insertion area 1-*a* represents the composition including 6 conditions as shown in FIG. 5. More specifically, a size of the image insertion area 1-*a* in the x direction (the horizontal direction) is 960 pixels while a size thereof in the y direction (the vertical direction) is 640 pixels. The image in the image insertion area 1-*a* includes two people, and the faces thereof are shown side by side. Background of the person in the right is white, and the centerline of the image falls in the middle of the two people. The face of the person in the left is within an area A1 shown in FIG. 5, while the face of the person on the right is within an area A2. In the case where the composition information includes a size of plain background of the subject, the composition information includes conditions defining the number of pixels representing a length from the top of the head to the upper side of the image and the numbers of pixels each representing lengths from the right and left ears to the right and left sides of the image, or a proportion of the background to a size of the face, for example.

Figure 6A:
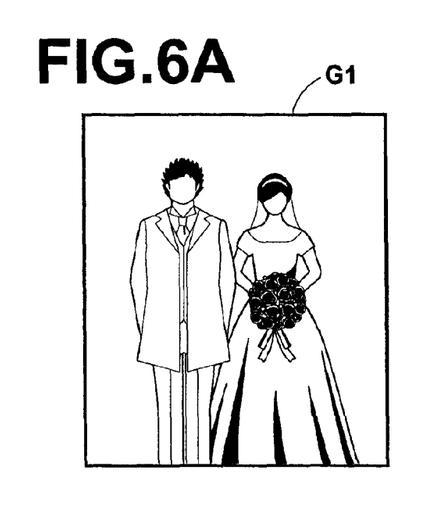
FIGS. 6A and 6B explain how an image is processed in generation of processing information.

When the operator selects one of the images for insertion in one of the image insertion areas (hereinafter referred to as the insertion image), the photo album editing PC 1 generates processing information representing a magnification ratio of the insertion image and a trimming position, with reference to the composition information of the image insertion area. In the case where an image G1 shown in FIG. 6A is selected as the insertion image for the image insertion area 1-*a*, for example, the photo album editing PC 1 recognizes that the insertion image has two people, based on the condition included in the composition information 1 for the image insertion area 1-*a*. The photo album editing PC 1 therefore extracts face areas from the image G1. More specifically, the photo album editing PC 1 extracts the face areas through extraction of skin-color areas having elliptic shapes in the image G1. Furthermore, the photo album editing PC 1 extracts the two face areas located side by side and having the white background for the right person.

Figure 6B:
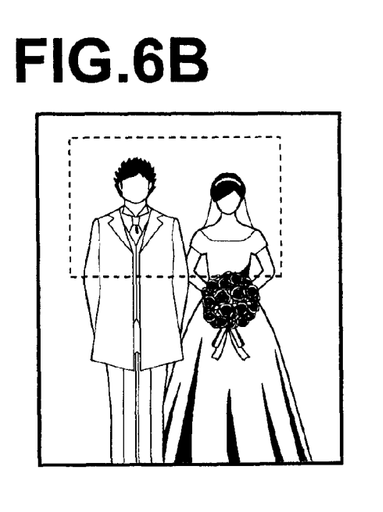

The photo album editing PC 1 then determines the magnification ratio and the trimming position of the image G1 so that the centerline of the image insertion area 1-*a* falls in the middle of the two face areas and the faces in the right and left are respectively contained in the areas A1 and A2 in the case where the image has the same size as the image insertion area 1-*a*. The photo album editing PC 1 generates the processing information representing the magnification ratio and the trimming position. The trimming position can be expressed as a two-dimensional displacement of the center of the insertion image after enlargement or reduction from the center of the image insertion area 1-*a*. More specifically, the trimming position can be expressed by the number of pixels in the x direction and the y direction between the center of the insertion image after enlargement or reduction and the center of the image insertion area. With reference to the processing information generated in this manner, the range surrounded by broken lines shown in FIG. 6B in the image is trimmed to cause the insertion image to have the size appropriate for the image insertion area.

In some cases, the insertion image selected by the operator satisfies not all of the conditions included in the composition information. In this case, the conditions may have order of priorities thereof so that the processing information can be generated as long as only the conditions of higher priorities are satisfied. For example, in the composition information shown in FIG. 5, the processing information is generated if only the conditions 2 and 2 are satisfied.

Scores may be given to the respective conditions in the composition information regarding the insertion image at the time of satisfaction thereof so that the processing information can be generated in the case where a total of the scores exceeds a predetermined value. For example, in the composition information shown in FIG. 5, the scores 5, 3, and 1 are respectively given the conditions 2, 3, and 4, and the processing information is generated if the total of the scores exceeds 7.

Depending on the insertion image, either the magnification ratio or the trimming position has already satisfied the corresponding condition in the composition information. In such a case, only the magnification ratio or the trimming position that originally has not satisfy the composition information is generated as the processing information.

For the image insertion area regarding which the processing information has been generated, the fact of completion of processing information generation and confirmation of the insertion image may be displayed in the editing screen 30. For example, a color of the image insertion area may be changed, or a mark may be added to the image insertion area. Alternatively, a number of the image insertion area may be displayed, or information on confirmation of the insertion image may be displayed in a list of the image insertion area number. Information representing completion of the processing for image quality change or image restoration on the insertion image may also be displayed in or around the image insertion area whose processing information has been generated.

After selecting all the images to be inserted in the respective image insertion areas and editing all the selected images, the operator clicks the OK button for ending the photo album editing operation using the template. The photo album editing PC 1 generates the image editing information including file names of the selected images, information relating the file names of the images to be inserted in the respective image insertion areas and the corresponding image insertion areas, information on the processing to be carried out on the image data sets such as blurring and red-eye correction, and the processing information. The image editing information is sent to the file server 5.

The image editing information may be stored in the photo album editing PC 1 not only after clicking of the OK button by the operator but also temporarily for each order of photo album generation so that the image editing information can be sent regularly to the file server 5 at predetermined intervals. The image editing information may be generated and sent to the file server 5 at the time of generation of the processing information regarding any one of the image insertion areas or regarding each of the pages in the template if the template has the pages.

The file server 5 stores the image data sets obtained by reading the images recorded on the developed film by using the mini-laboratory 3A or 3B or the scanner 3C. The image data sets are stored in a folder generated for the user who requested the photo album generation. The file server 5 also stores the template data set representing the template to be used for photo album generation as well as the guide image data sets representing the guide images to be inserted in the image insertion areas.

The file server 5 refers to the photo album editing information sent from the photo album editing PC 1, and sends the template data set representing the template selected by the user, the image data sets stored in the folder corresponding to the user ID, and the guide image data sets representing the guide images to be inserted in the image insertion areas in the selected template to the photo album editing PC 1.

When the image editing information is sent from the photo album editing PC 1, the file server 5 refers to the file names of the image data sets representing the selected images included in the image editing information, and carries out preparatory processing and editing processing on the selected image data sets for generating processed image data sets. The preparatory processing includes at least one of: brightness correction processing, color correction processing and gradation correction processing on the selected image datasets. The editing processing includes the processing specified by the image editing information. More specifically, the editing processing includes the processing for changing image quality such as blurring, sharpening, and brushing, the processing such as trimming and enlargement or reduction according to the processing information, the rotation processing, and the image restoration processing such as red-eye correction and scar removal on the image data sets specified by the image editing information, in the case where the processing described above is specified in the image editing information.

Figure 7:
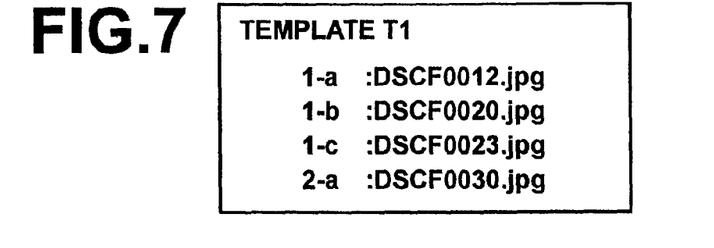
FIG. 7 shows an example of layout information.

The file server 5 generates layout information from the information relating the file names of the image data sets and the image insertion areas of the template included in the image editing information. FIG. 7 shows an example of the layout information. As shown in FIG. 7, the layout information relates the names of the image data sets (DSCF0012.jpg, DSCF0020.jpg, DSCF0023.jpg, and DSCF0030.jpg) and the corresponding image insertion areas 1-*a*, 1-*b*, 1-*c*, and 2-*a* in the template T1. The file server 5 sends the processed image data sets and the layout information to either the mini-laboratory 3A or 3B.

The process management PC 7 receives information representing completion of the processes such as the photo album editing operation, printing, and photo album inspection input by the operator, in order to manage the processes regarding each order for photo album generation. In the case where the photo album has passed the inspection carried out by the operator for examining the quality of the generated photo album, the process management PC receives information thereon, and finishes the process management for the photo album. In the case where the photo album did not pass the inspection, the process management PC 7 receives an instruction for generating the photo album again.

Figure 8:
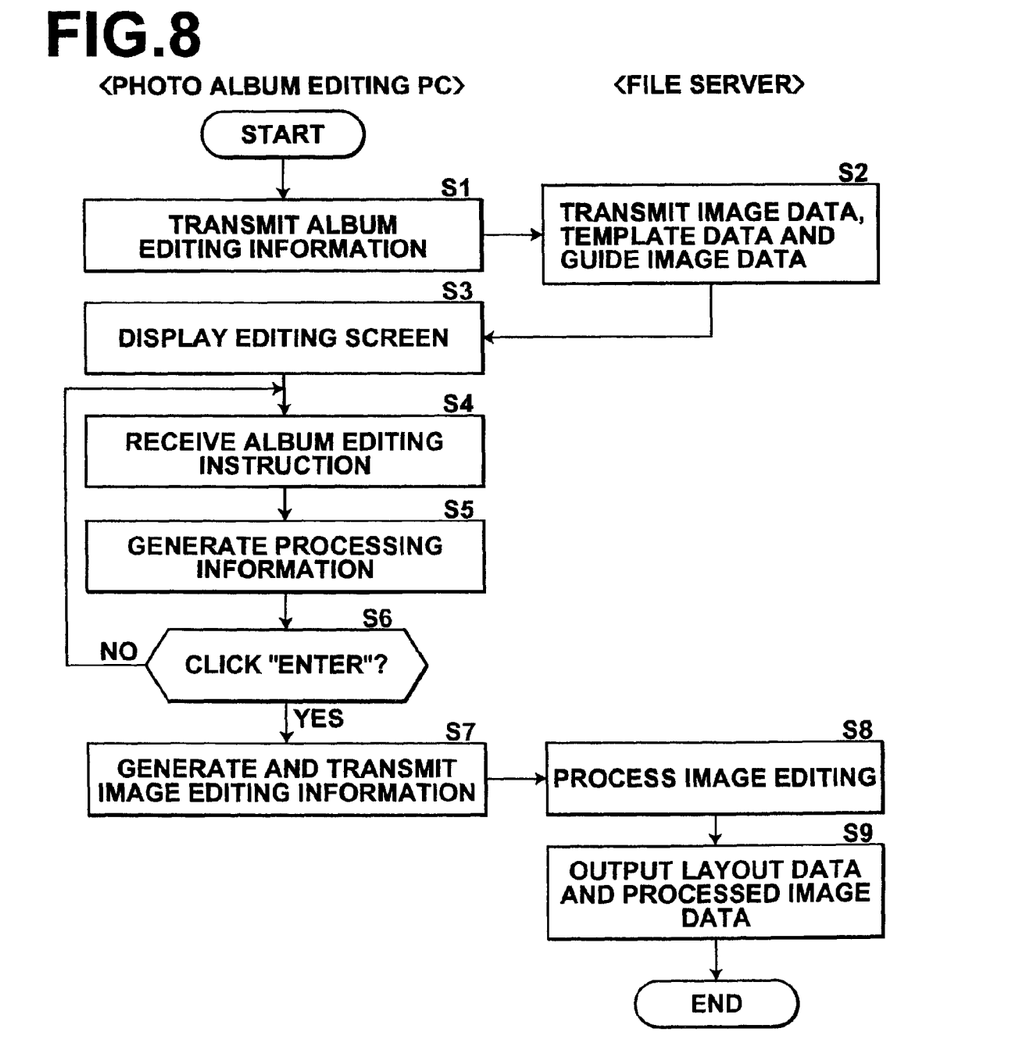
FIG. 8 is a flow chart showing a procedure carried out in the embodiment.

A procedure carried out in this embodiment will be explained next. FIG. 8 is a flow chart showing the procedure. The file server 5 has already stored the image data sets obtained by reading the images from the developed film recorded with photographs on the wedding of the user.

When the operator inputs a photo album editing instruction from the photo album editing PC 1, the procedure starts. The photo album editing PC 1 sends the photo album editing information including the user ID and the information on the template selected by the user to the file server 5 (Step S1).

The file server 5 receives the photo album editing information, and sends the image data sets stored in the folder corresponding to the user ID, the template data set representing the template selected by the user, and the guide image data sets representing the guide images to be inserted in the image insertion areas in the template to the photo album editing PC 1 (Step S2).

The photo album editing PC 1 receives the image data sets, the template data set, and the guide image data sets, and displays the editing screen 30 on the display means 15 (Step S3). The guide images represented by the guide image data sets are inserted in the corresponding image insertion areas in the template displayed in the template display field 33 in the editing screen 30.

The photo album editing PC 1 receives the photo album editing instructions input by the operator referring to the editing screen 30 (Step S4). The photo album editing PC 1 generates the processing information when the insertion image to be inserted in the corresponding image insertion area is selected during reception of the editing instructions (Step S5). The photo album editing PC 1 then judges whether or not the OK button has been clicked (Step S6). If a result at Step S5 is affirmative, the photo album editing PC generates the image editing information, and sends the image editing information to the file server 5 (Step S7). If the result at Step S6 is negative, the procedure returns to Step S4 for continuously receiving the editing instructions from the operator.

The file server 5 receives the image editing information, and carries out the editing processing with reference to the file names of the selected image data sets included in the image editing information (Step S8). The file server 5 sends the processed image data sets generated through the editing processing and the layout information generated from the image editing information to either the mini-laboratory 3A or 3B (Step S9) to end the procedure.

The mini-laboratory 3A or 3B receives the processed image data sets and the layout information, and prints the processed image data sets for generating prints thereof. The operator (or an operator dedicated to photo album binding) pastes the prints in print insertion areas in photo album paper corresponding to the template while referring to the layout information, and carries out binding for generating the photo album.

The operator in charge of quality control inspects the photo album generated in this manner. In the case where the photo album has passed the inspection, the photo album is sent to the user. In the case where the photo album did not pass the inspection, the process management PC 7 orders the photo album generation again.

As has been described above, in this embodiment, when the insertion image to be inserted in the corresponding image insertion area in the template is selected, the processing information is generated for processing the insertion image so that the insertion image has the composition appropriate for the image insertion area. Therefore, the file server 5 can carry out enlargement or reduction and trimming on the selected image for causing the image to have the composition appropriate for the image insertion area, with reference to the processing information. Consequently, if the same template is used, the composition of the images to be included in a photo album becomes the same. As a result, the composition of the images selected for insertion does not change from operator to operator or from day to day, and photo albums generated in this manner have a constant quality. Furthermore, an editing operation for determining the magnification ratio and the trimming position becomes unnecessary, which reduces a burden on the operator.

Figures 9, 10A:
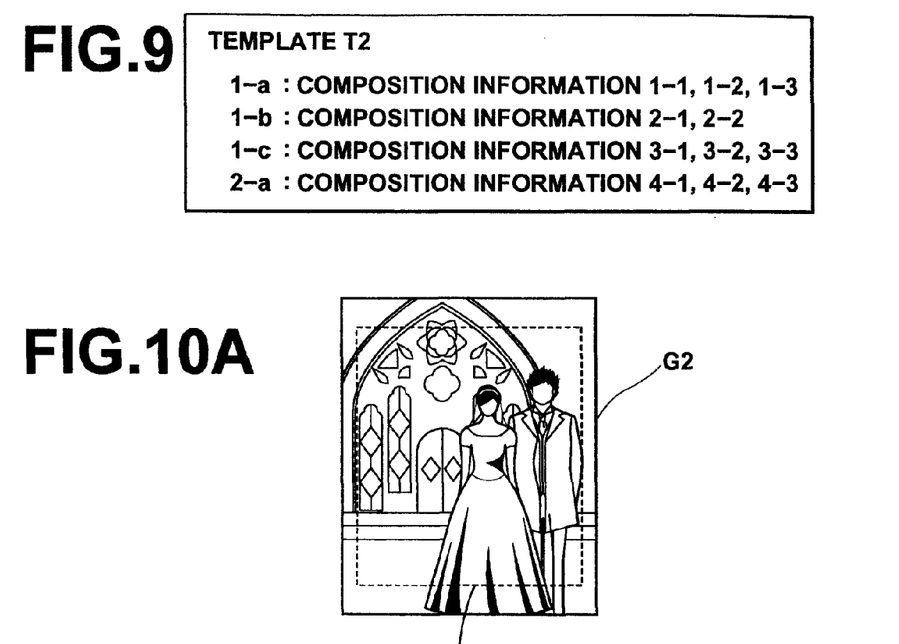
FIG. 9 shows an example indicating that composition information is related to an image insertion area in the second embodiment.
FIGS. 10A and 10B show an example of images to be used for the second embodiment.

In the first embodiment described above, while one piece of composition information is related to one image insertion area as shown in FIG. 4, it may be possible to relate multi pieces of composition information to one image insertion area. Regarding such a case, the explanation is described bellow as a second embodiment. FIG. 9 shows an example of the composition information related to the image insertion areas. In the second embodiment, as shown in the FIG. 9, the composition information 1-1, 1-2, and 1-3 representing compositions of images to be inserted in the image insertion area 1-*a* in the template T2 represented by template data is recorded in a header of the template data. Moreover, the composition information 2-1 and 2-2 representing compositions of images inserted in the image insertion area 1-*b*, the composition information 3-1, 3-2, and 3-3 representing compositions of images to be inserted in the image insertion area 1-*c*, and the composition information 4-1, 4-2, and 4-3 representing compositions of images to be inserted in the image insertion area 2-*a* are also recorded in the header.

As described above, in such case that multi pieces of composition information are attached to one image insertion area, the composition information is related to scene information representing suitable scene for the composition represented by the composition information, and when an operator selects an image to be inserted in an image insertion area, the operator also inputs scene information of the selected image in the album editing PC 1. The album editing PC 1 selects composition information in accordance with the input scene information and generates processing information. It may also possible to automatically determine scene information of the selected image.

In this embodiment, the composition information 2-1 includes information indicating that whole figures of two people are contained in a composition, and the composition information 2-2 includes information shown in the FIG. 5. Moreover, the composition information 2-1 is related to scene information of a scene in which the bride and groom are standing in the front of a stained-glass window, and the composition information 2-2 is related to scene information indicating a scene in which the bride and groom are side-by-side.

Figure 10B:
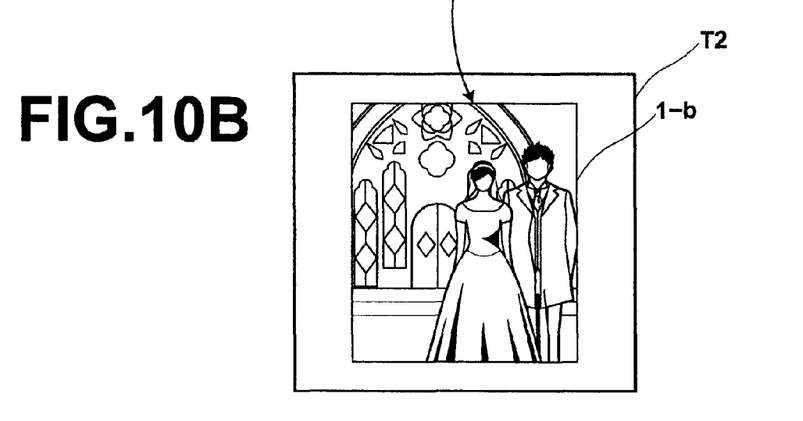

If an operator selects the image G2 shown in the FIG. 10A as an insertion image and inputs the scene in which the bride and groom are standing in the front of a stained-glass winder as scene information, the album editing PC 1 selects the composition information 2-1, determines a trimming position so as to contain the two people and the stained-glass window in whole region of the image insertion area 1-*b* in order to insert the image G2 suitably in the image insertion area 1-*b* as shown in the FIG. 10B, and generates processing information indicating the determined trimming position and a magnifying rate of the image G2. If the image G1 shown in the FIG. 5A is selected as an insertion image and the scene in which the bride and groom are side-by-side is input as scene information, the album editing PC 1 selects the composition information 2-2 and generates processing information in the same way described in the first embodiment.

Further, it may be available to attach the composition information described in the second embodiment and correspondence information to a template. The correspondence information represents correspondence between a predetermined image insertion area and a correspondence image insertion area corresponding to the predetermined image insertion area. Each area is one of the image insertion areas included in the template. Regarding such a case, an explanation is described as a third embodiment bellow.

Figure 11:
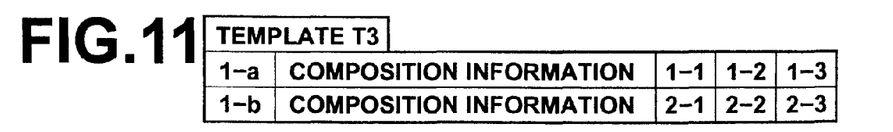
FIG. 11 shows an example of correspondence information in the third embodiment.

The FIG. 11 shows an example of correspondence information in the third embodiment. In the third embodiment, the template T3, which includes the image insertion areas 1-*a* and 1-*b*, each area is applied to each of two facing pages, is used for editing. As shown in the FIG. 11, the correspondence information represents that the image insertion area 1-*a* in the template T3 is attached with the correspondence information 1-1, 1-2, and 1-3, the image insertion area 1-*b* is attached with the composition information 2-1, 2-2, and 2-3, and the composition information 1-1 and 2-1, the composition information 1-2 and 2-2, and the composition information 1-3 and 2-3 are related to each other. The correspondence information is recorded in a header of template data indicating the template T3.

In the third embodiment, the composition information is also related to scene information.

The composition information 1-1 includes information indicating that a person dressed in black is facing to the right, and the composition information 2-1 corresponding to the composition information 1-1 includes information indicating that a person dressed in white is facing to the left. Further, the composition information 1-1 is related to scene information indicating a scene of a face of the groom.

Figure 12A:
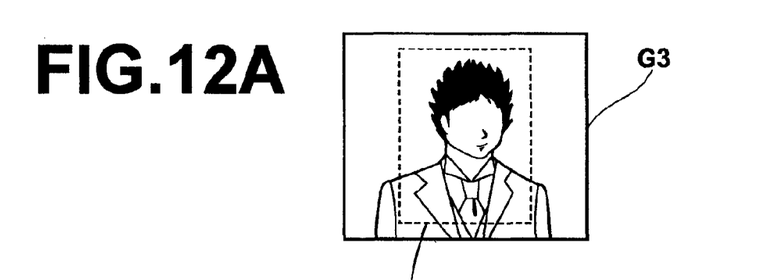
FIGS. 12A, 12B, and 12C show a first example of images to be used for the third embodiment.
Figures 12B, 12C:
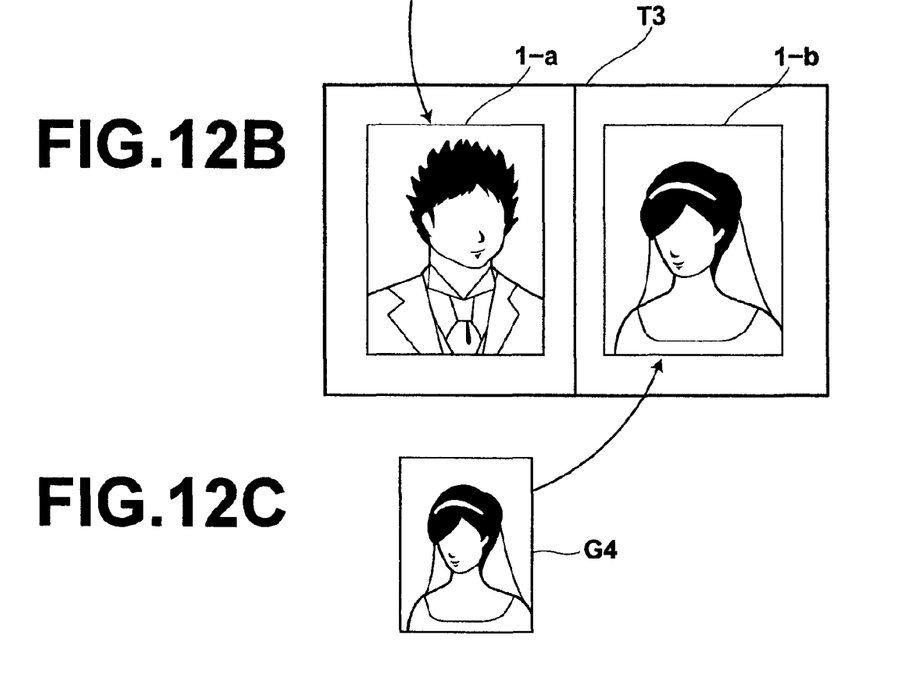

If an operator selects the image G3 shown in the FIG. 12A as an insertion image, and inputs the scene indicating a face of the groom as scene information, the album editing PC 1 selects the composition information 1-1, determines a trimming position so as to contain the face of the groom in whole region of the image insertion area 1-*a* in order to insert the image G3 in the image insertion area 1-*a* in the template T3 as shown in the FIG. 12B, further determines a magnifying rate of the insertion image in order to cause the insertion image to have a suitable size for the image insertion area 1-*a*, and then, generates processing information indicating the determined trimming position and the determined magnifying rate. Additionally, in this case, the image contains the person dressed in white and facing to the left should be inserted in the image insertion area 1-*b*. Upon selection of the image G4 (FIG. 12C) as an image to be inserted in the image insertion area 1-*b* by the operator, the album editing PC 1 determines a trimming position regarding the image G4 so as to the face of the bride is contained in whole region of the image insertion area 1-*b* with reference to the composition information 2-1, further determines a magnifying rate of the image G4 in order to cause the image G4 to have a suitable size for the image insertion area 1-*b*, and then, generates processing information indicating the determined trimming position and the determined magnifying rate.

On the other hand, it is available to use the template T4 including two image insertion area 1-*a* and 1-*b*, the one is lager than the other, in one page. In this case, it is assumed that the image insertion area 1-*a* in the template T4 is attached with composition information 1-1, 1-2, and 1-3, the image insertion area 1-*b* is attached with composition information 2-1, 2-2, and 2-3, and the composition information 1-1 and 2-1, the composition information 1-2 and 2-2, the composition information 1-3 and 2-3 are related to with each other.

Further, it is assumed that the composition information 1-1 includes information indicating that two people is contained in a composition, and the composition information 2-1 corresponding to the composition information 1-1 includes information indicating that two rings are on a cushion. Moreover, the composition information is related to scene information of a scene for exchanging rings.

Figure 13A:
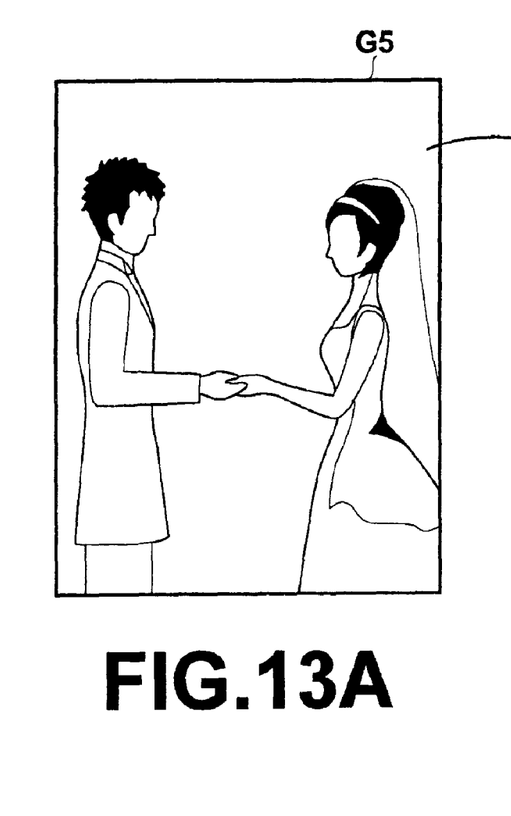
FIGS. 13A, 13B, and 13C show a second example of images to be used for the third embodiment.

If an operator selects the image G5 shown in FIG. 13A as an insertion image and inputs the scene for exchanging rings as scene information, the image editing PC 1 selects composition information 1-1, determines a trimming position so as to contain the upper bodies of the bride and groom in the whole region of the image insertion area 1-*a* in order to insert the image G5 suitably to the image insertion area 1-*a* in the template T5, further determines a magnifying rate of the insertion image in order to cause the insertion image to have a suitable size for the image insertion area 1-*a*, and then, generates processing information indicating the determined trimming position and the determined magnifying rate. Further, in this case, the image in which two rings are on a cushion should be inserted in the image insertion area 1-*b*.

Figure 13B:
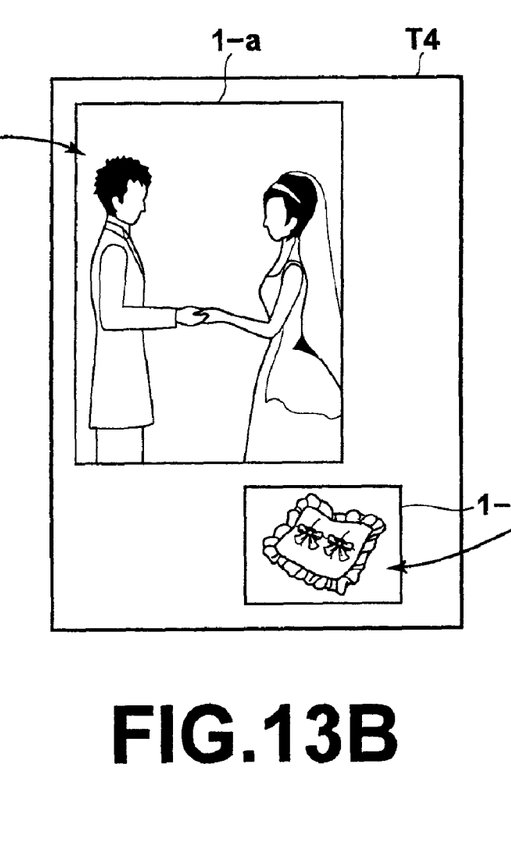
Figure 13C:
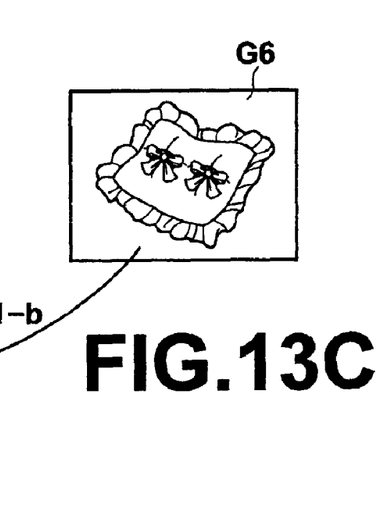

Therefore, upon selection of the image G6 as an image to be inserted in the image insertion area 1-*b* by the operator, the image editing PC 1 determines a trimming position so as to contain the cushion in whole region of the image insertion area 1-*b* with reference to the composition information 2-1, further determines a magnifying rate of the insertion image in order to cause the insertion image to have a suitable size for the image insertion area 1-*b*, and then, generates processing information indicating the determined trimming position and the determined magnifying rate.

It is also available to magnify a part of an image to be inserted in an image insertion area and insert the part in another image insertion area. In this case, the magnified part is selected in accordance with details of the image. For example, if the insertion image is a scene of exchanging rings, the magnified part of the image should be a region including hands of the bride and groom. If the insertion image is a scene of signing wedding pledge card, it is a common practice to magnify the card. Further, if the insertion image is a scene in which the bride and groom are standing with a wedding bouquet, it is a common practice to magnify the wedding bouquet.

In order to deal with the case described above, in which a part of an insertion image to be inserted in a predetermined image insertion area is magnified and the part is inserted in a correspondence image insertion area corresponding to the predetermined image insertion area, it may be possible to attach at least a piece of composition information to each of the predetermined image insertion area and the correspondence image insertion area, and attach correspondence information representing correspondence between the predetermined image insertion area and the correspondence image insertion area to a template. Regarding such case, an explanation is described bellow as a fourth embodiment.

Figure 14:
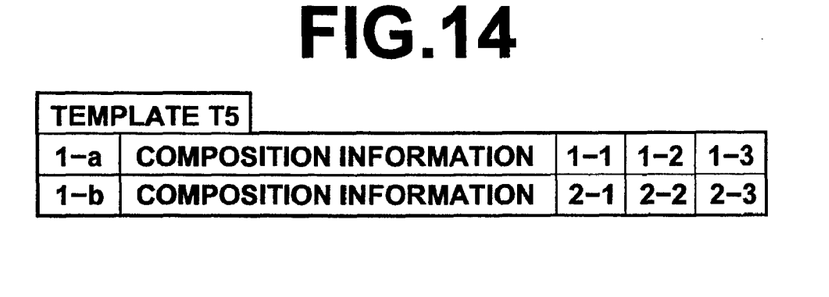
FIG. 14 shows an example of correspondence information in the fourth embodiment.

The FIG. 14 shows an example of correspondence information in the fourth embodiment. In the fourth embodiment, the template T5 including in one page two image insertion areas 1-*a* and 1-*b*, the one is larger than the other, is used for editing. As shown in the FIG. 14, the correspondence information indicate that the image insertion area 1-*a* in the template T5 is attached with the composition information 1-1, 1-2, and 1-3, the image insertion area 1-*b* is attached with the composition information 2-1, 2-2, and 2-3, and the composition information 1-1 and 2-1, the composition information 1-2 and 2-2, and the composition information 1-3 and 2-3 are related to each other. In this case, the correspondence information is recorded in a header of template data.

Additionally, the composition information is related to scene information in the fourth embodiment.

It is assumed that the composition information 1-1 includes information indicating that two people are contained in a composition and they have a wedding bouquet at a portion bellow a center of the image. It is also assumed that the composition information 2-1 corresponding to the composition information 1-1 includes information indicating that only the wedding bouquet is contained in a composition. Further, the composition information 1-1 is related to scene information of a scene in which the bride and groom are standing with a wedding bouquet.

Figures 15A, 15B:
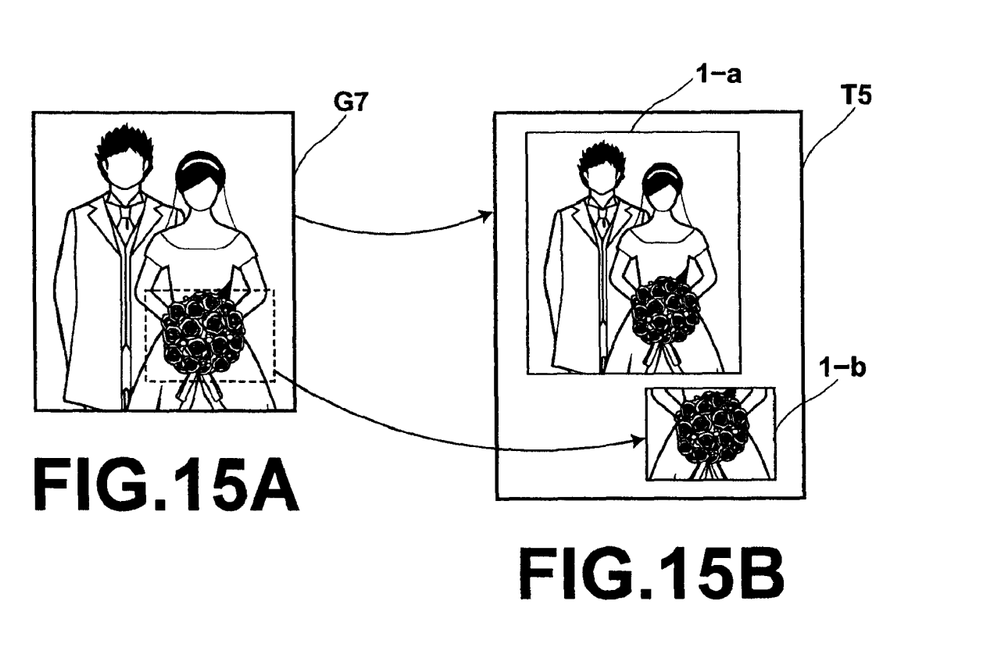
FIGS. 15A and 15B show a fourth example of images to be used for the fourth embodiment.

If an operator selects the image G7 shown in the FIG. 15B as an insertion image and inputs the scene in which the bride and groom are standing with the wedding bouquet, the image editing PC 1 selects the composition information 1-1, determines a trimming position of the insertion image so as to contain the bride and groom in whole region of the image insertion area 1-*a* in order to insert the image G7 suitably in the imager insertion area 1-*a* in the template T5, further determines a magnifying rate of the insertion image in order to cause the insertion image to have a suitable size for the image insertion area 1-*a*, and then, generates processing information indicating the determined trimming position and the determined magnifying rate. Further, in this case, the image of the wedding bouquet should be inserted in the image insertion area 1-*b*. Therefore, the image editing PC 1 determines a trimming position so as to cut a part regarding the wedding bouquet from the image G7 selected by the operator as an image to be inserted in the image insertion area 1-*a*, further determines a magnifying rate of the cut part in order to the part to have a suitable size for the image insertion area 1-*b*, and then, generates processing information indicating the determined trimming position and the determined magnifying rate.

In each embodiment described above, the composition information is information regarding people, as shown in FIG. 5. However, the composition information may include information on background (such as a church, sea, and trees) and information on the number of people to be included in a class photo, for example.

Furthermore, the processing information may include information on image rotation. For example, in the case where the composition information includes a condition that an area of sky is near the upper side of the image, an area of sky is detected in the selected image. If no area of sky is included near the upper side of the image, the processing information includes a direction and an angle of rotation so that the image has the area of sky near the upper side thereof. If the area of sky is present near the left side of the selected image, the processing information includes the information of rotation in the clockwise direction by 90 degrees, for example. The processing information may include the information on the rotation angle according to an angle of camera at the time of photography, since photography is carried out with a camera having an arbitrary angle (such as 45 degrees) in some cases.

In each embodiment described above, the processed image data sets of the selected images are printed by the mini-laboratory 3A or 3B, and the operator pastes the prints on the photo album paper corresponding to the template for generating the photo album. However, the file server 5 may generate a composite image data set representing an image (a photo album image) having the images selected by the operator and inserted in the image insertion areas in the template by combining the processed image data sets and the template data set. The composite image data set is output to the mini-laboratory 3A or 3B.

If the mini-laboratory 3A or 3B prints the composite image data set generated in this manner, the photo album can be generated by simply binding the print of the photo album image, without pasting the prints on the paper.

In each above-described embodiment, the photo album is generated by using the image data sets obtained by reading the images recorded on the developed film. However, a photo album can be generated by using image data sets obtained by a digital camera. In this case, the file server 5 comprises a media drive for reading the image data sets from a recording medium such as a memory card storing the image data sets obtained by photography. The image data sets read from the recording medium by the media drive are stored in the file server 5. A photo album can also be generated by using image data sets obtained by a camera-embedded mobile phone. In this case, the image data sets sent from the mobile phone via a mobile phone communication network are stored in the file server 5.

In each above-described embodiment, the file server 5 carries out the preparatory processing only on the image data sets selected by the operator using the photo album editing PC 1. However, all the image data sets may be stored in the file server 5 after the preparatory processing carried out thereon when the image data sets are received from the mini-laboratory 3A or 3B or from the scanner 3C. Furthermore, the photo album editing PC 1 may carry out the preparatory processing on all the image data sets sent from the file server 5 or on the image data sets selected for the photo album generation.

Further, in each above-described embodiment, it is available that the image editing PC 1 or the file server 5 generates data (album data), in which an image of an user is inserted in a template, based on the layout information, and the generated data is transmitted to and stored in a server, or the like, enable to be accessed by the user. Thereby, the user is capable of checking doneness of album before creating the album. In this case, it may be also available to let the user select whether to create the album by using the album data or to start editing from the beginning again.

What is claimed is:

1. An image editing apparatus comprising:
    a display unit which displays various kinds of information thereon;
    an image display control unit which displays a catalog of plural images on the display unit;
    a template display control unit which displays on the display unit the catalog of plural images and a template being used as a photo album paper, said template having at least one image insertion area, each area attached with multiple pieces of composition information representing composition of an image or images to be inserted in the area;
    a designation reception unit which receives designation of image insertion area in the template displayed on the display unit;
    an image selection unit which receives selection of image to be inserted in the designated image insertion area from the catalog of plural images; and
    a processing information generation unit which selects a piece of composition information suitable for the selected image from the multiple pieces of compensation information attached to the designated image insertion area in accordance with a scene property of the selected image, and generates processing information including information on a magnification ratio and/or a trimming position regarding the selected image in order to process the selected image to have the composition represented by the selected composition information, with reference to the selected composition information of the designated image insertion area.

2. An image editing method comprising:
    displaying a catalog of plural images on a display unit:
    displaying the catalog of plural images and a template being used as a photo album paper, said template having at least one image insertion area, each area attached with multi pieces of composition information representing compositions of image to be inserted in the area;
    receiving designation of image insertion area in the template displayed on the display unit;
    receiving selection of image to be inserted in the designated image insertion area from the catalog of plural images;
    selecting a piece of composition information suitable for the selected image to be inserted in the designated image insertion area from the multi pieces of composition information attached to the designated image insertion area, in accordance with a scene property of the selected image; and
    generating processing information including information on a magnification ratio and/or a trimming position regarding the selected image to be inserted in the designated image insertion area in accordance with a scene property of the selected image in order to process the selected image to have the composition represented by the selected composition information, with reference to the selected composition information.

3. A non-transitory computer-readable medium storing a program which when executed by a computer causes the computer to execute an image editing method comprising:
    displaying a catalog of plural images on a display unit;
    displaying on the display unit the catalog and a template being used as a photo album paper, said template having at least an image insertion area, each area attached with multi pieces of composition information representing composition of an image to be inserted in the area;
    receiving designation of image insertion area in the template displayed on the display unit;
    receiving selection of image to be inserted in the designated image insertion area from the catalog of plural images;
    selecting composition information suitable for the selected image to be inserted in the designated image insertion area from the multi pieces of composition information attached to the designated image insertion area, in accordance with a scene property of the selected image; and
    generating processing information including information on a magnification ratio and/or a trimming position regarding the selected image to be inserted in the designated image insertion area in accordance with a scene property of the selected image in order to process the selected image to have the composition represented by the selected composition information, with reference to the selected composition information.

* * * * *